United States Patent
Yeleshwarapu et al.

(10) Patent No.: US 8,768,930 B2
(45) Date of Patent: Jul. 1, 2014

(54) PRODUCT CLASSIFICATION IN PROCUREMENT SYSTEMS

(75) Inventors: Chandra Yeleshwarapu, Foster City, CA (US); Keshava Rangarajan, Foster City, CA (US); Sudeep Agarwal, San Francisco, CA (US); Athanasios Bismpigiannis, Sunnyvale, CA (US); Nagaraj Srinivasan, Union City, CA (US); Ashish Pathak, Belmont, CA (US); Munagala Kodanda Ram, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 80 days.

(21) Appl. No.: 12/767,286

(22) Filed: Apr. 26, 2010

(65) Prior Publication Data

US 2011/0087626 A1 Apr. 14, 2011

Related U.S. Application Data

(60) Provisional application No. 61/250,509, filed on Oct. 10, 2009.

(51) Int. Cl.
*G06F 17/30* (2006.01)

(52) U.S. Cl.
USPC .......................... 707/740; 707/767; 707/771

(58) Field of Classification Search
None
See application file for complete search history.

(56) References Cited

U.S. PATENT DOCUMENTS

| 5,787,283 | A | 7/1998 | Chin et al. |
|---|---|---|---|
| 6,892,192 | B1 | 5/2005 | Geddes et al. |
| 7,613,695 | B1 | 11/2009 | Solomon et al. |
| 7,761,319 | B2 | 7/2010 | Gil et al. |
| 7,774,363 | B2 | 8/2010 | Lim |
| 7,969,306 | B2 | 6/2011 | Ebert et al. |
| 8,180,760 | B1 * | 5/2012 | Carver et al. ................. 707/708 |
| 8,527,545 | B2 | 9/2013 | Bobick et al. |
| 2002/0059201 | A1 | 5/2002 | Work |
| 2002/0184218 | A1 | 12/2002 | Bailey et al. |
| 2003/0109951 | A1 | 6/2003 | Hsiung et al. |
| 2003/0229550 | A1 | 12/2003 | DiPrima et al. |
| 2004/0117242 | A1 | 6/2004 | Conrad et al. |
| 2004/0168069 | A1 | 8/2004 | Knight |

(Continued)

OTHER PUBLICATIONS

Butner, Karen et al., "Sense-and-respond supply chains: enabling breakthrough strategy," IBM Global Business Services, Aug. 2004, 16 pages.

(Continued)

*Primary Examiner* — Son T Hoang
(74) *Attorney, Agent, or Firm* — Kilpatrick Townsend & Stockton LLP (57) ABSTRACT

Various embodiments provide solutions to assist in the classification of products in a procurement system. The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical and/or tangible computer readable media (such as, to name but a few examples, optical media, magnetic media, and/or the like).

15 Claims, 6 Drawing Sheets

(56) References Cited

U.S. PATENT DOCUMENTS

| | | |
|---|---|---|
| 2004/0210574 A1 | 10/2004 | Aponte et al. |
| 2006/0190490 A1 | 8/2006 | Ritchey et al. |
| 2006/0224585 A1 | 10/2006 | Brockmeier |
| 2006/0277145 A1* | 12/2006 | Raccah et al. ................ 705/40 |
| 2007/0070409 A1* | 3/2007 | Nakagawa et al. ......... 358/1.15 |
| 2007/0073719 A1* | 3/2007 | Ramer et al. .................... 707/10 |
| 2007/0233575 A1 | 10/2007 | Berger et al. |
| 2007/0250330 A1 | 10/2007 | Chen et al. |
| 2007/0260627 A1 | 11/2007 | Knittel et al. |
| 2008/0005076 A1 | 1/2008 | Payne et al. |
| 2008/0059474 A1 | 3/2008 | Lim |
| 2008/0071595 A1 | 3/2008 | Chang et al. |
| 2008/0077530 A1 | 3/2008 | Banas et al. |
| 2008/0097748 A1 | 4/2008 | Haley et al. |
| 2008/0162164 A1 | 7/2008 | Segler et al. |
| 2008/0209078 A1 | 8/2008 | Bates et al. |
| 2008/0212899 A1* | 9/2008 | Gokturk et al. ............... 382/305 |
| 2008/0294607 A1* | 11/2008 | Partovi et al. .................... 707/3 |
| 2008/0300933 A1 | 12/2008 | Britton et al. |
| 2009/0132389 A1 | 5/2009 | Klinger et al. |
| 2009/0132448 A1 | 5/2009 | Eder |
| 2009/0132500 A1* | 5/2009 | Jones et al. ...................... 707/3 |
| 2009/0187883 A1 | 7/2009 | Kuester et al. |
| 2009/0192987 A1 | 7/2009 | Loeser et al. |
| 2009/0222444 A1* | 9/2009 | Chowdhury et al. ............. 707/5 |
| 2009/0319342 A1 | 12/2009 | Shilman et al. |
| 2010/0049590 A1 | 2/2010 | Anshul |
| 2010/0088629 A1* | 4/2010 | Xu et al. ....................... 715/780 |
| 2010/0145815 A1 | 6/2010 | Weng |
| 2010/0185630 A1 | 7/2010 | Cheng et al. |
| 2010/0198820 A1 | 8/2010 | Work |
| 2010/0262550 A1 | 10/2010 | Burritt et al. |
| 2010/0293169 A1* | 11/2010 | Takata et al. .................. 707/749 |
| 2010/0306119 A1 | 12/2010 | Banerjee et al. |
| 2011/0047246 A1 | 2/2011 | Frissora et al. |
| 2011/0055186 A1 | 3/2011 | Gopalakrishnan |
| 2011/0082848 A1 | 4/2011 | Goldentouch |
| 2011/0087604 A1 | 4/2011 | Chung et al. |
| 2011/0161253 A1 | 6/2011 | Ma et al. |
| 2011/0191417 A1 | 8/2011 | Rathod |
| 2011/0209193 A1 | 8/2011 | Kennedy |
| 2011/0209195 A1 | 8/2011 | Kennedy |
| 2011/0209196 A1 | 8/2011 | Kennedy |
| 2011/0231407 A1 | 9/2011 | Gupta et al. |
| 2011/0252121 A1 | 10/2011 | Borgs et al. |
| 2011/0252463 A1 | 10/2011 | Yeleshwarapu et al. |
| 2011/0302102 A1 | 12/2011 | Yeleshwarapu et al. |
| 2011/0307478 A1 | 12/2011 | Pinckney et al. |
| 2012/0030160 A1 | 2/2012 | Ratnam et al. |
| 2012/0166247 A1 | 6/2012 | Tu et al. |
| 2012/0323617 A1 | 12/2012 | Papst |
| 2013/0254075 A1 | 9/2013 | Ballaro et al. |

OTHER PUBLICATIONS

Ferrari, Bob, "Analyst: Sense and Respond goes Beyond RFID," RFID Update, May 24, 2006, 2 pages.

Gunasekaran, A. et al., "Information systems in supply chain integration and management," European Journal of Operational Research, 2003, pp. 269-295.

Kumar, Sandeep et al., "Creating Supply Chain Flexibility in the Flattening World," SETLabs Briefings, vol. 5, No. 3, Jul.-Sep. 2007, pp. 1-13.

Polymita Technologies, "Business Activity Monitoring," http://www.polymita.com/portal/bpm/bam, downloaded Jun. 19, 2009, 3 pages.

SAP Solution Brief, "Supply Chain Execution Sense and Respond with an Adaptive Supply Chain Network," 2005, 4 pages.

Schiefer, Josef et al., "Management and Controlling of Time-Sensitive Business Processes with Sense & Respond," Proceedings of the 2005 International Conference on Computational Intelligence for Modeling, Control and Automation, downloaded Jun. 18, 2009, 6 pages.

Supply Chain Management, http://www.eil.utoronto.ca/profiles/rune/node5.html, downloaded Jun. 19, 2009, 13 pages.

U.S. Appl. No. 12/757,763, filed Apr. 9, 2010, 42 pages.

U.S. Appl. No. 12/793,375, filed Jun. 3, 2010, 27 pages.

U.S. Appl. No. 12/844,632, filed Jul. 27, 2010, 41 pages.

U.S. Appl. No. 12/757,763, filed Apr. 9, 2010, Final Office Action mailed Aug. 22, 2012, 30 pages.

U.S. Appl. No. 12/757,763, filed Apr. 9, 2010, Office Action mailed Mar. 16, 2012, 33 pages.

U.S. Appl. No. 12/793,375, filed Jun. 3, 2010, mailed May 29, 2012, 6 pages.

U.S. Appl. No. 12/793,375, filed Jun. 3, 2010, Final Office Action mailed Dec. 7, 2012, 23 pages.

U.S. Appl. No. 12/757,763, filed Apr. 9, 2010, Office Action mailed Apr. 23, 2013, 51 pages.

U.S. Appl. No. 12/844,632, filed Jul. 27, 2010, Non-Final Office Action mailed Feb. 28, 2013, 29 pages.

U.S. Appl. No. 12/793,375, filed Jun. 3, 2010 Advisory Action mailed Mar. 8, 2013, 4 pages.

Author Unknown, "Ariba Network Discovery Supplier Datasheet," 2008, Ariba, Inc, http://www.ariba.com/network/downloads/A_Ariba_Network_Discovery_Datasheet.pdf, 2 pages.

Author Unknown, "E-Sourcing: A Faster Way to Find Verified Suppliers," 2009, http://www.globalsources.com/SITE/E-SOURCING/E-SOURCING.HTM, 1 page.

Author Unknown, "Emptoris—The #1 Strategic Sourcing Solution," 2006, http://www.emptoris.com/solutions/strategic_sourcing_solutions.asp, 3 pages.

Lu, H., et al., "Testing pervasive software in the presence of context inconsistency resolution services," Proceedings of the 30th International Conference on Software Engineering, 2008, ACM, New York, NY, USA, pp. 61-70.

U.S. Appl. No. 12/757,763, filed Apr. 9, 2010, Final Office Action mailed Dec. 5, 2013, 27 pages.

U.S. Appl. No. 12/844,632, filed Jul. 27, 2010, Final Office Action mailed Jun. 26, 2013, 11 pages.

U.S. Appl. No. 12/844,632, filed Jul. 27, 2010, Advisory Action mailed Sep. 12, 2013, 2 pages.

Xu, Chang, et al., "Heuristics-Based Strategies for Resolving Context Inconsistencies in Pervasive Computing Applications," The 28th International Conference on Distributed Computing Systems, Jun. 20, 2008, pp. 713-721.

U.S. Appl. No. 12/844,632, Notice of Allowance mailed on Dec. 23, 2013, 10 pages.

* cited by examiner

PRODUCT CLASSIFICATION IN PROCUREMENT SYSTEMS

CROSS-REFERENCE TO RELATED APPLICATIONS

This application claims the benefit, under 35 USC §119(e), of commonly-owned, copending provisional U.S. Patent Application No. 61/250,509, filed Oct. 10, 2009 by Chandra Yeleshwarapu et al. and titled, "Product Classification in Procurement Systems," the entire disclosure of which is incorporated herein by reference for all purposes.

This application relates to U.S. patent application Ser. No. 12/757,763, entitled METHOD AND SYSTEM FOR PROVIDING ENTERPRISE PROCUREMENT NETWORK, filed on Apr. 9, 2010, U.S. patent application Ser. No. 12/844,632, entitled METHOD AND SYSTEM FOR PROVIDING DECISION MAKING BASED ON SENSE AND RESPOND, filed on Jul. 27, 2010, U.S. patent application Ser. No. 12/793,375, entitled COMMUNITY RATING IN ENTERPRISE APPLICATIONS, filed on Jun. 3, 2010, which are incorporated by reference in their entirety for any and all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

In many enterprises, an employee can purchase products through the procurement infrastructure offered by the enterprise. The number of products offered through the procurement services of the enterprise may be extremely large. In order to manage all these effectively, all the products often are classified in certain categories, like IT products, marketing products, etc. These categories may include subcategories; for instance, IT products may include the categories Hardware, Software and Services. In this way, both the employees and the procurement department of the enterprise can manage the products lists more efficiently.

But problems may occur when someone purchases a product that is not listed in any of the previously mentioned categories. In this case the employee needs to add the category by herself. Most of the time, this is difficult and complicated, since the number of categories of products may be large and the difference between some of them may not be obvious. Then the employee may assign the product to the wrong category or even not assign it to any of them. This leads to a corruption in the hierarchical structure of the product categories. Even in the case where the user assigns a product to the correct category, it may take too long to navigate through the whole list and decide the corresponding category. In other cases, to alleviate the issue, the system defaults the category to Miscellaneous resulting in a large spend being categorized in the miscellaneous bucket or incorrectly classified due to human error.

BRIEF SUMMARY

Various embodiments provide solutions to assist in the classification of products in a procurement system. The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical and/or tangible computer readable media (such as, to name but a few examples, optical media, magnetic media, and/or the like).

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

The following detailed description illustrates a few exemplary embodiments in further detail to enable one of skill in the art to practice such embodiments. In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Figure 1:
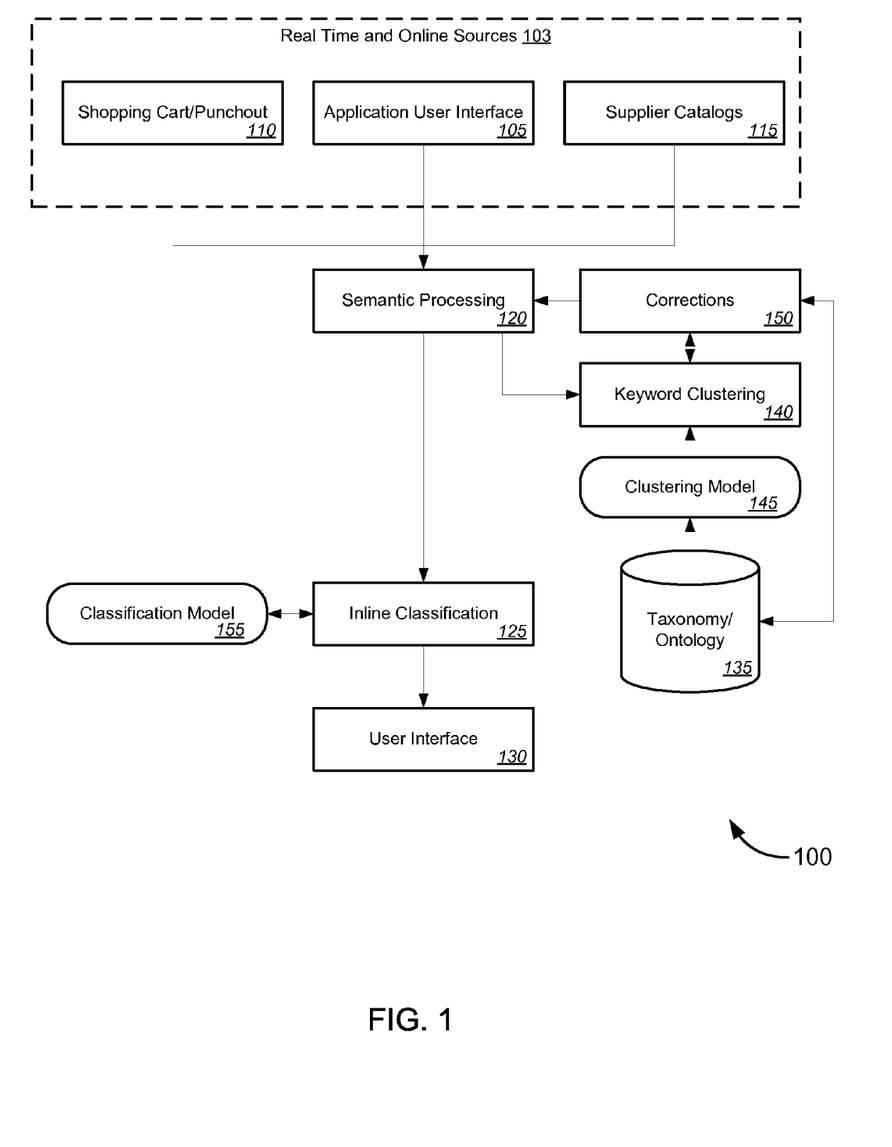
FIG. 1 is a generalized block diagram illustrating a workflow for product classification in accordance with various embodiments.

A set of embodiments provides tools and techniques to assist with the classification of products, which may be of particular use in a procurement system. FIG. 1 illustrates a workflow process for classification of products in such a system. In one aspect, certain embodiments provide inline product classification, allowing an employee attempting to procure a product to obtain the most accurate category that the product can be assigned to. In one embodiment, the application suggests the best fitting categories based on the item type, item description, Supplier, Supplier site, Price, Quantity, and/or UOM provided by the user. The data can come from multiple sources like: user input from the employee (e.g., input received via an application interface 105), real-time integration mechanisms like content returning to a procurement system shopping cart from a punchout 110 to a supplier web site (in this context, a punchout is a facility provided by the procurement system which can allow the user to browse the supplier's web site, or certain content thereof, to find desired products while remaining within the context of the procurement system), and/or from a supplier catalog 115 being uploaded by a supplier to the procurement system.

Figure 2:
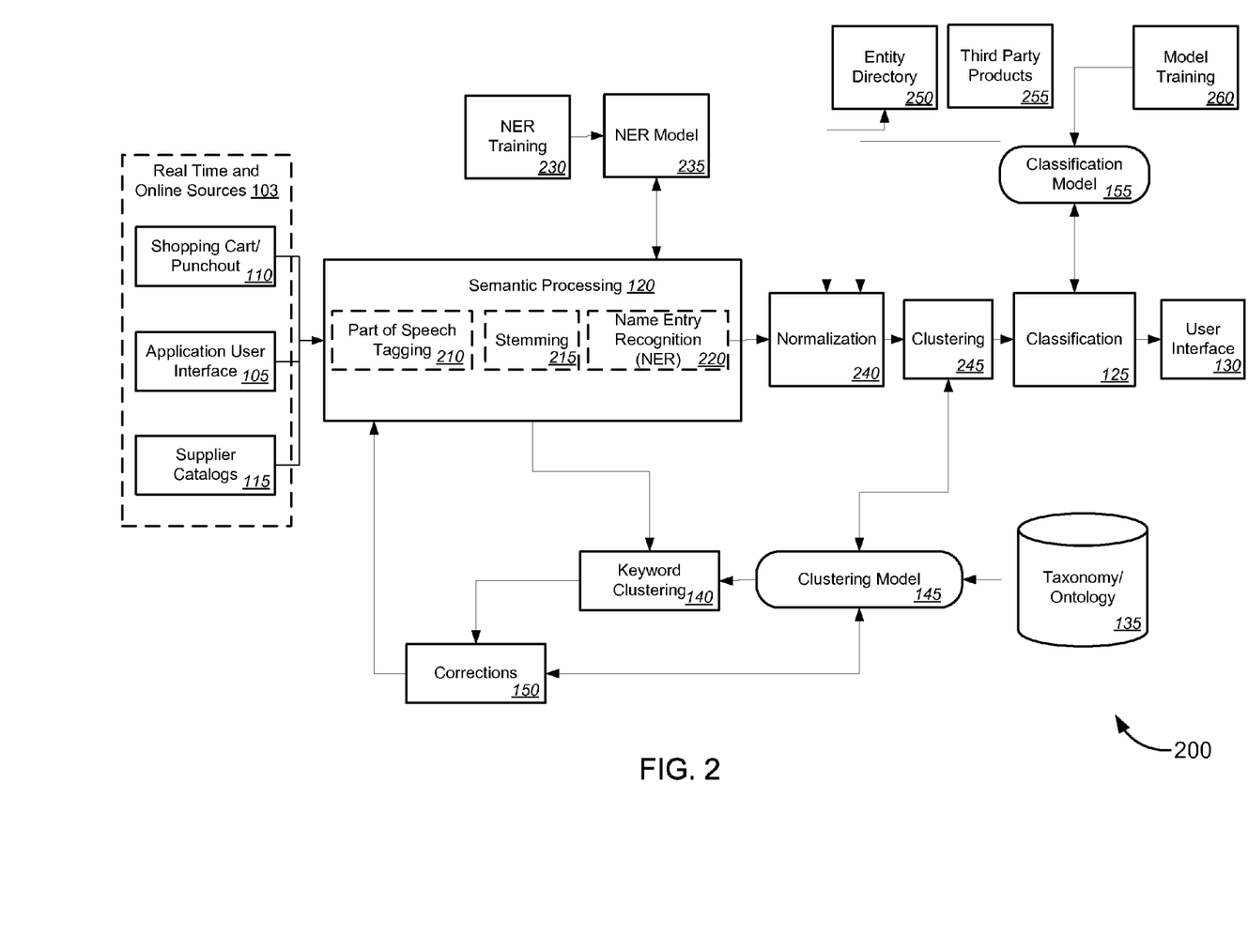
FIG. 2 is a generalized block diagram illustrating a workflow for product classification in accordance further embodiments of the present invention.

In some embodiments, the data gathered from these sources is cleaned and normalized to improve the quality and is transformed and fused. To achieve the cleansing and transformation the incoming data may sent through a pipeline of semantic processing units 120. Turning briefly to FIG. 1 which illustrates, in part, the pipeline for semantic processing 120. Specifically, with regard to part of speech (POS) tagging module 210, Stemming module 215, and Name Entity Recognition (NER) module 220.

In one embodiment, POS tagging module 210 split the concatenated input string into nouns, verbs, etc. For example, a string such as "ordering a packet of BIC ball point pens from Office Depot", may be split as follows: Verbs: ordering, and Nouns: BIC, ball, point, pen, Office, Depot. Accordingly, POS tagging module 210 effectively splits words by such a categorization.

Further, Stemming module 215 extracts the root of each word such that only the "root" of a word remains. For example, the stem (or root) of the word "ordering" is the word "order", the stem of the word "classifying" is the word "classify", and so forth. In one embodiment, the output of Stemming module 215 is forwarded to the NER Module 220. During the NER process each of the words are matched to a known list of entities in the system. The NER model creation 235 and NER training 230 are described in detail in FIG. 3 below.

Furthermore, clustering module 240 groups the words extracted from Semantic Processing 120, in order to enrich the available information. For example, referring back to the above example, ball+point+pen->ball-point pen (office supplies), and Office+Depot->Office Depot (supplier of office supplies), and so forth. As such, more usable word combinations are generated, thus enhancing classification.

Furthermore, From NER module 220 the string is transformed to a categorical domain. A hierarchical taxonomy consists of multiple levels, (i.e., L1, L2, L3, etc.). For each set of strings multiple models are run for each level value within the target taxonomy (i.e., rather than running one large model, multiple models are run). For each level of the taxonomy, the model provides a confidence level as an output. The confidence level defines the category in which the item is classified on this level of the taxonomy. If the efficacy is low, rules, and possibly human intervention, are used to improve the input set of strings for each model equating to each level value.

For example, "BIC" is influencing the results since it is affecting a pen, a razor, and stapler categories, thus dropping the word "BIC" from the input string results in better classification. Computation of the confidence and the accuracy is computed at each level rather than one single number for the leaf node. The use of multiple models for each level of the hierarchical taxonomy is also applied in the case of assisted classification. In this case, the user does not have to choose the classification for each level of the taxonomy by parsing through the entire list of categories, but instead the system suggests a smaller group of categories that have improved matching with the input string.

As a result of this semantic processing 120, the processed data is enriched with keywords that are generated by the system. These keywords are then presented to an inline classification engine 125, which makes predictions about how the product should be classified, as described in further detail below.

In certain embodiments, the system evaluates the new enriched data and determines a level of confidence about the certainty of the inline-classification engine 125 being able to correctly predict the product's categorization. If the suggested confidence number is above the 'threshold of confidence' (which can be set by the user, may be provided by default parameters, etc.), then the enriched data may be sent to the inline-classification engine 125. As a result, in some cases, categories predicted by inline-classification engine are presented to the user (e.g., via the user interface 130). In an aspect, each one of the suggested categories is rated, so that the one with the largest rate value has a better fit with the product and the product characteristics.

If the suggested confidence number is below the 'threshold of confidence' then the data may be presented to the user via a user interface for user review and enrichment. In this case, the user is provided with an interface to edit and manually improve the quality of data. To facilitate this process, the user may be presented with suggestions of keywords from a knowledge base 135 used by the inline-classification engine, which can substantially improve the quality of predictions made. The keywords that are shown to the user might first be clustered 140 (based, e.g., on a clustering model 145 that is configured to maintain associations between various keywords), so that similar keywords are grouped together for easier management.

When the user is sifting through the keywords to find a perfect match the user essentially performs an intelligent contextual search using the keywords that have been presented to the user and/or available description text on the transaction. This search is performed on the taxonomy and ontology that works as the knowledge base 135 for the classification models and also other enterprise sources. In some cases, the keywords that are selected manually by this process can also be used to correct or enrich 150 the ontology, knowledge base and business rules that drive the clustering model 145, which in turn drives the clustering 140 of generated keywords. This feedback loop will enhance the intelligence of the clustering model 145 such that in future and for similar events, keywords that were manually selected will also be suggested by the system in later iterations involving similar products.

In certain embodiments, the system keeps a log of the keywords that are used by the user to enhance the quality of the data (thus creating a knowledge base 135 for the system) and when similar data is processed in future the system assists by indicating the corrections that have been incorporated historically. These suggestions are made on the intelligence derived from the knowledge base. Additionally or alternatively, the system may employ classification models 155, which are used by the inline-classification engine 125, and may also be based on knowledge base 135. And the core classification models 155 are also based on technology that learns continually from the manual updates made to the categories that are predicted by the classification models 155.

In other embodiments, the system can provide hierarchical classification to further assist the user. Merely by way of example, the classification taxonomy might have multiple levels. A top level might include, for instance, "office products" and "marketing products" (among others). Each top level classification might include multiple lower-level classifications. Hence, there might be a classification for "office products.pens" and "marketing products.pens" (using the format "level1.level2"). For ease of illustration, the example hierarchy described herein includes only two levels, but it should be appreciated that some embodiments might have many levels (or only one level, in which case the classification taxonomy would not be hierarchical), with each level having multiple classifications subordinate to the classifications of the level above.

In an aspect of certain embodiments, the system will attempt to select the best possible option (and/or alternate options) at each level of the hierarchy. Hence, in such embodiments, a user attempting to purchase a lot of ballpoint pens would not be presented with all of the possible classifications at the top level, but instead might be presented with the "office supplies" classification (with an 80% confidence level) and the "marketing supplies" classification (with a 40% confidence level). (These confidence levels might be informed by earlier users' classification efforts and/or by other factors, as described above). If the user selects "office supplies" from among the two presented options, the user then might be presented with a "pen" classification (with a 90% confidence level) and a "pencil" classification (with a 10% confidence level).

In this way, certain embodiments allow the user to select the best possible option at each level while browsing a pruned set of classification records, rather than the entire universe of possible options. In this way, the system not only can save the user time and effort, but also direct the user to the best possible options (which might otherwise be overlooked in a massive list of all possible options).

Figure 3:
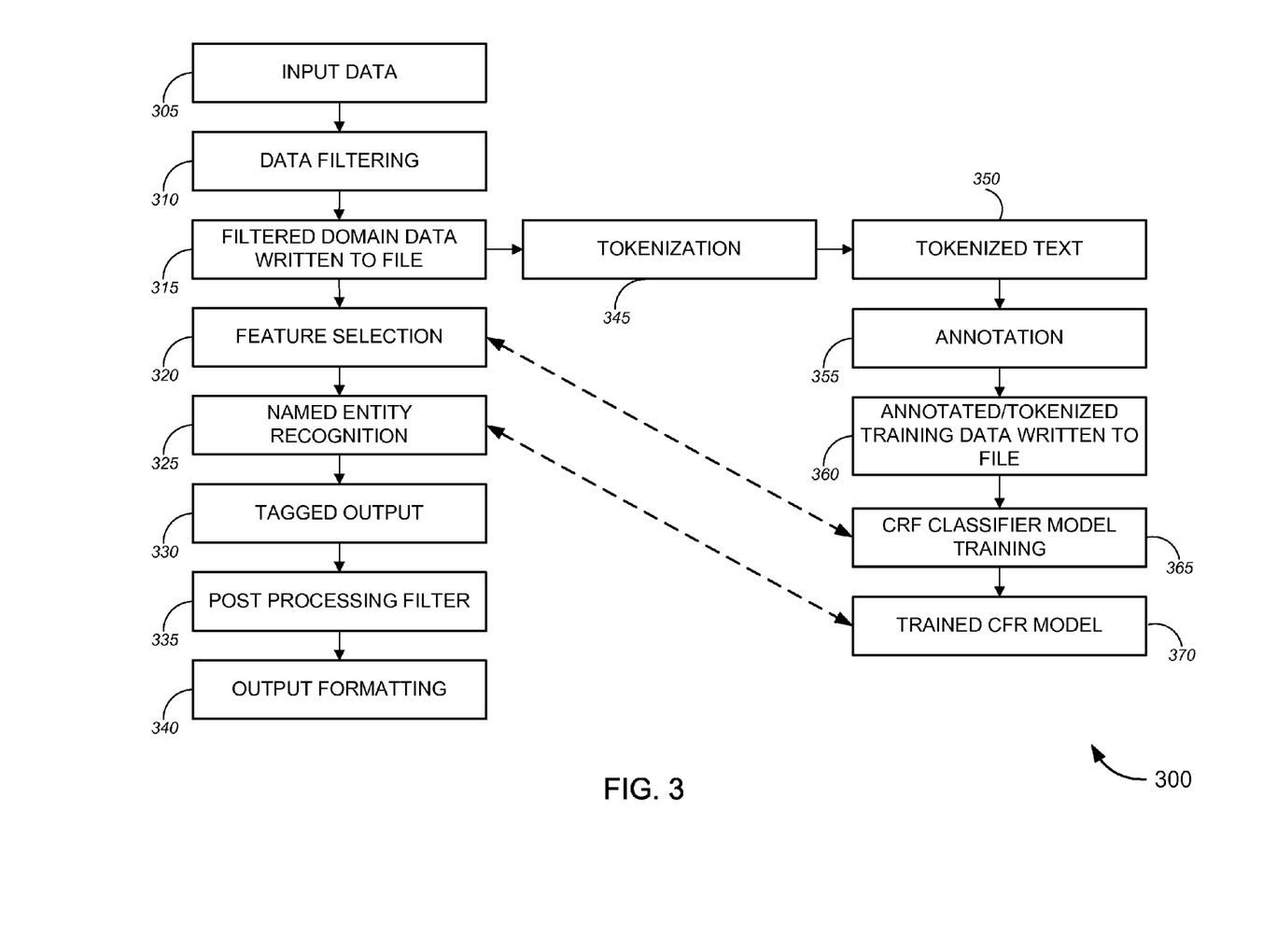
FIG. 3 is a process flow diagram illustrating a method of implementing name entry recognition, in accordance with various embodiments

Turning now to FIG. 3, which illustrates the NER process. At process block 305, input data is received. At process block 310, the inputted data is filtered and written to a file (process block 315). In one embodiment, the file may be a database, a text file, a hash, etc. Furthermore, features are selected (process block 320) and NER occurs (process block 325). The output is then tagged (process block 330), post processing in performed (process block 335), and the formatted data is outputted and received by normalization module 240.

At process block 345, tokenization of the filtered data occurs and the text is tokenized (process block 350). Annotations are then made (process block 355), and the annotated/tokenized text is written to a file (process block 360). In one embodiment, the file may be a database, a text file, a hash, etc. At process block 365, conditional random fields (CRF) classification model training is performed and then the trained CRF model is outputted (process block 370).

Furthermore, once the features have been identified during the feature selection (process block 320) it is possible to append the list into the training data that is in the annotated/tokenized text in the file (process block 360). The features in the training data file (process block 360) can also be used as a reference during the feature selection (process block 320). Entities may then be identified from the input data during the NER stage (process block 325). During the NER stage the CRF model created (process block 365) is used to detect the entities. Manual changes made to the predicted entity names can be used to enrich the CRF model (process block 365).

Figure 4:
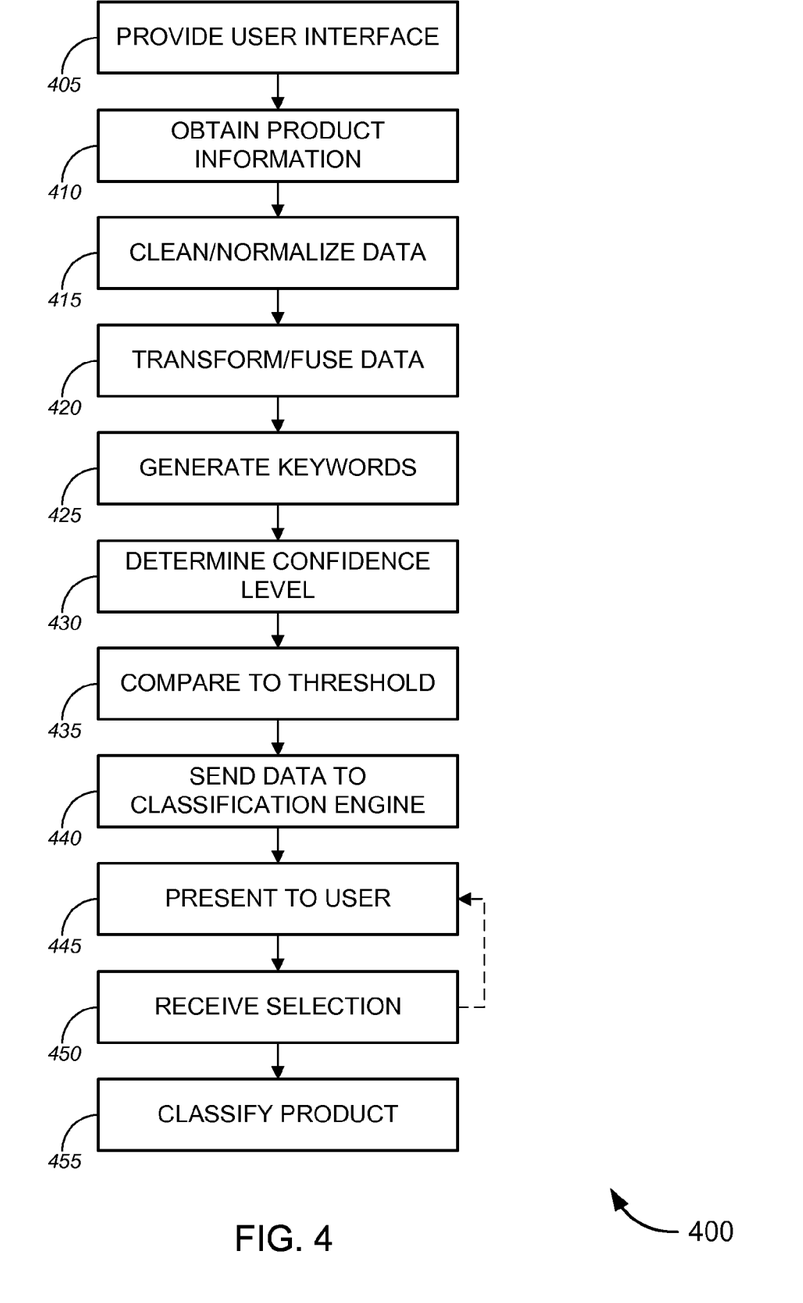
FIG. 4 is a process flow diagram illustrating a method of assisting a user in classifying a product, in accordance with various embodiments

FIG. 4 illustrates a method that can be used to assist a user in classifying a selected product that the user would like to procure. While the techniques and procedures of FIG. 4 are depicted and/or described in a certain order for purposes of illustration, it should be appreciated that certain procedures may be reordered and/or omitted within the scope of various embodiments. Moreover, while the methods illustrated by FIG. 4 can be implemented by (and, in some cases, are described below with respect to) the systems 100, 200, and/or 500 of FIGS. 1, 2, and 5, respectively (or components thereof), these methods may also be implemented using any suitable hardware implementation. Similarly, while the systems 100, 200, 500, and 600 (and/or components thereof) can operate according to the methods illustrated by FIG. 4 (e.g., by executing instructions embodied on a computer readable medium), the systems 100, 200, and 500 can also operate according to other modes of operation and/or perform other suitable procedures.

The method 400, in the illustrated embodiment, further comprises providing a user interface to allow interaction between a user and the computer system (block 405). For example, the user interface can be used to output information for a user, e.g., by displaying the information on a display device, printing information with a printer, playing audio through a speaker, etc.; the user interface can also function to receive input from a user, e.g., using standard input devices such as mice and other pointing devices, keyboards (both numeric and alphanumeric), microphones, etc. The procedures undertaken to provide a user interface, therefore, can vary depending on the nature of the implementation; in some cases, providing a user interface can comprise displaying the user interface on a display device; in other cases, however, where the user interface is displayed on a device remote from the computer system (such as on a client computer, wireless device, etc.), providing the user interface might comprise formatting data for transmission to such a device and/or transmitting, receiving and/or interpreting data that is used to create the user interface on the remote device. Alternatively and/or additionally, the user interface on a client computer (or any other appropriate user device) might be a web interface, in which the user interface is provided through one or more web pages that are served from a computer system (and/or a web server in communication with the computer system), and are received and displayed by a web browser on the client computer (or other capable user device). The web pages can display output from the computer system and receive input from the user (e.g., by using Web-based forms, via hyperlinks, electronic buttons, etc.). A variety of techniques can be used to create these Web pages and/or display/receive information, such as JavaScript, Java applications or applets, dynamic HTML and/or AJAX technologies.

In many cases, providing a user interface will comprise providing one or more display screens, each of which includes one or more user interface elements. As used herein, the term "user interface element" (also described as a "user interface mechanism" or a "user interface device") means any text, image or device that can be displayed on a display screen for providing information to a user and/or for receiving user input. Some such elements are commonly referred to as "widgets," and can include, without limitation, text, text boxes, text fields, tables and/or grids, charts, hyperlinks, buttons, lists, combo boxes, checkboxes, radio buttons, and/or the like. While the exemplary display screens described herein employ specific user interface elements appropriate for the type of information to be conveyed/received by computer system in accordance with the described embodiments, it should be appreciated that the choice of user interface element for a particular purpose is typically implementation-dependent and/or discretionary. Hence, the illustrated user interface elements employed by the display screens described herein should be considered exemplary in nature, and the reader should appreciate that other user interface elements could be substituted within the scope of various embodiments.

As noted above, in an aspect of certain embodiments, the user interface provides interaction between a user and a computer system. Hence, when this document describes procedures for displaying (or otherwise providing) information to a user, or to receiving input from a user, the user interface may be the vehicle for the exchange of such input/output. Merely by way of example, in a set of embodiments, the user interface allows the user to select a product to be procured and/or to select a classification for that product.

At block 410, the method comprises obtaining product information (from a user, supplier punchout, online catalog, etc.). At block 415, the system cleans and/or normalizes the data (which might originate at several different data sources) to allow it to be used collectively for analysis, and at block 420, the system transforms and/or fuses the data to produce a result set. From this result set, a set of one or more keywords is generated (block 425). At this point, the system determines a confidence level for each of the one or more keywords (block 430) and compares these confidence levels with a specified threshold (block 435). This confidence level expresses the estimated predictive power of the keywords with respect to identifying an appropriate classification for the product. If one or more possible keywords are identified, the keywords are provided to the classification engine (block 430), which predicts one or more classifications that the user might select (e.g., based on keywords and their associated the confidence levels) at block 440. At block 445, these predicted classifications are presented to a user, and at block 450, the system receives (e.g., via a user interface) a selection from the user of one of the classifications. In a hierarchical classification taxonomy, these operations may be repeated as necessary at successive levels of the hierarchy. At block 455, the product is classified according to the user's selection, and/the classification information may be saved for future use.

One set of embodiments provides tools and techniques to assist a user in procuring a product through a procurement system. Often, such a procurement system is implemented as an enterprise application (and/or as part of a suite of enterprise applications) that is implemented, for example, on an application server and/or that employs a database that is managed by a database server. One example of such a suite of applications is the Oracle Advanced Procurement™ suite, which is part of the Oracle e-Business Suite™ of enterprise applications available from Oracle Corporation™ Generally, such an application will execute on a computer system, examples of which are described below in conjunction with FIGS. 5 and 6.

In some cases, such a system will include a user interface to allow users to interact with the computer system. A variety of user interfaces may be provided in accordance with various embodiments, including without limitation graphical user interfaces that display, for a user, display screens for providing information to the user and/or receiving user input from a user. Merely by way of example, in some embodiments, the computer system may be configured to communicate with a client computer via a dedicated application running on the client computer; in this situation, the user interface might be displayed by the client computer, based on data and/or instructions provided by the computer system. In this situation, providing the user interface might comprise providing the instructions and/or data to cause the client computer to display the user interface. In other embodiments, the user interface may be provided from a web site that is incorporated within (and/or in communication with) a server executing a procurement application e.g., by providing a set of one or more web pages, which may be displayed in a web browser running on the user's client computer and/or served by a web server. In various embodiments, the computer system operating the procurement application might comprise the web server and/or be in communication with the web server, such that the computer system provides data to the web server to be served as web pages for display by a browser at the user's computer.

Figure 5:
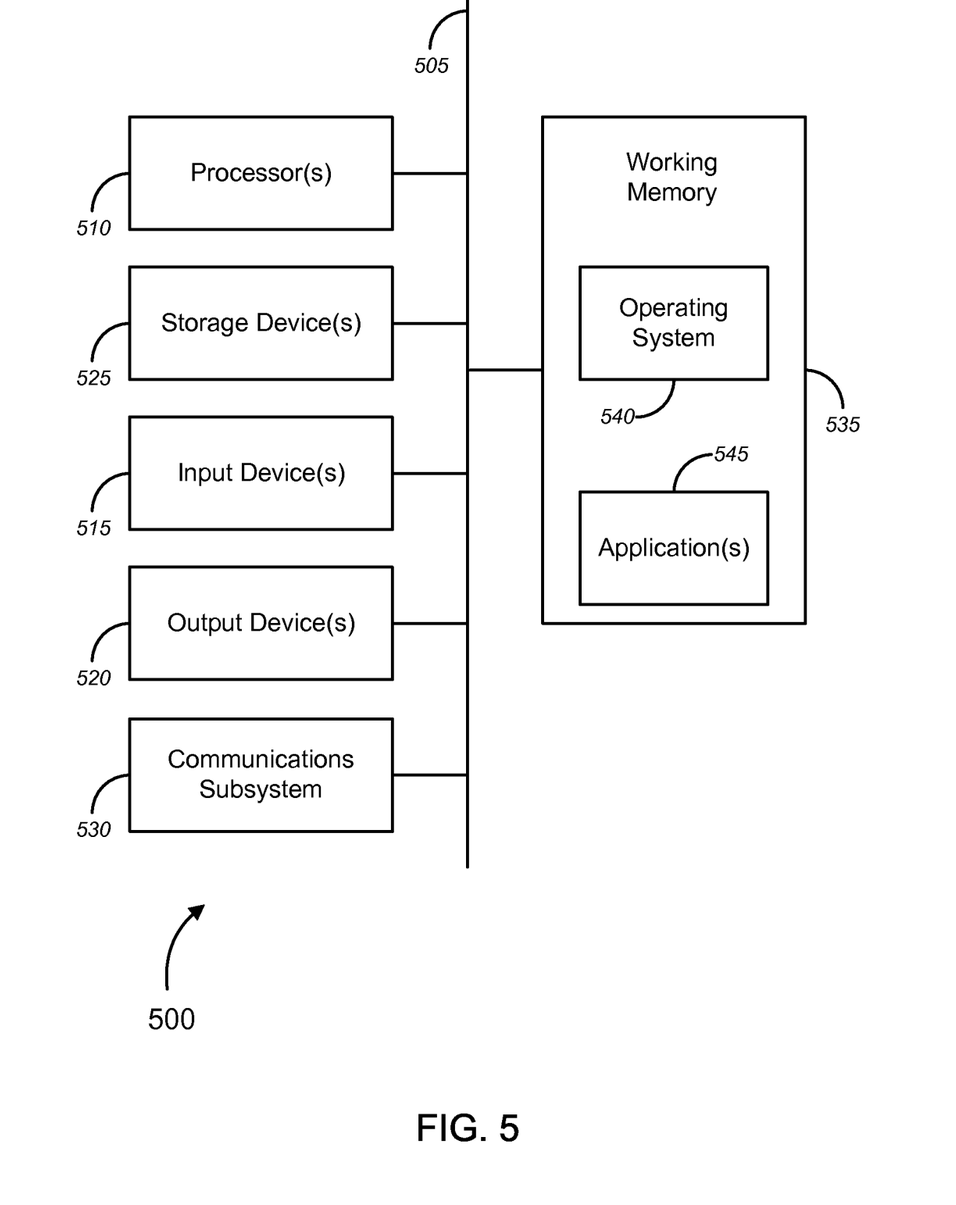
FIG. 5 is a generalized schematic diagram illustrating a computer system, in accordance with various embodiments.

FIG. 5 provides a schematic illustration of one embodiment of a computer system 500 that can perform the methods provided by various other embodiments, as described herein, and/or can function as a computer system to operate a procurement application, as described herein, an application server, a web server, etc. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer systems, and/or with any other devices described herein. In many embodiments, the computer system 500 will further comprise a working memory 535, which can include a RAM or ROM device, as described above.

The computer system 500 also may comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operation in a specific fashion. In an embodiment implemented using the computer system 500, various computer readable media might be involved in providing instructions/code to processor(s) 510 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical and/or magnetic disks, such as the storage device(s) 525. Volatile media includes, without limitation, dynamic memory, such as the working memory 535. Transmission media includes, without limitation, coaxial cables, copper wire and fiber optics, including the wires that comprise the bus 505, as well as the various components of the communication subsystem 530 (and/or the media by which the communications subsystem 530 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 410.

Figure 6:
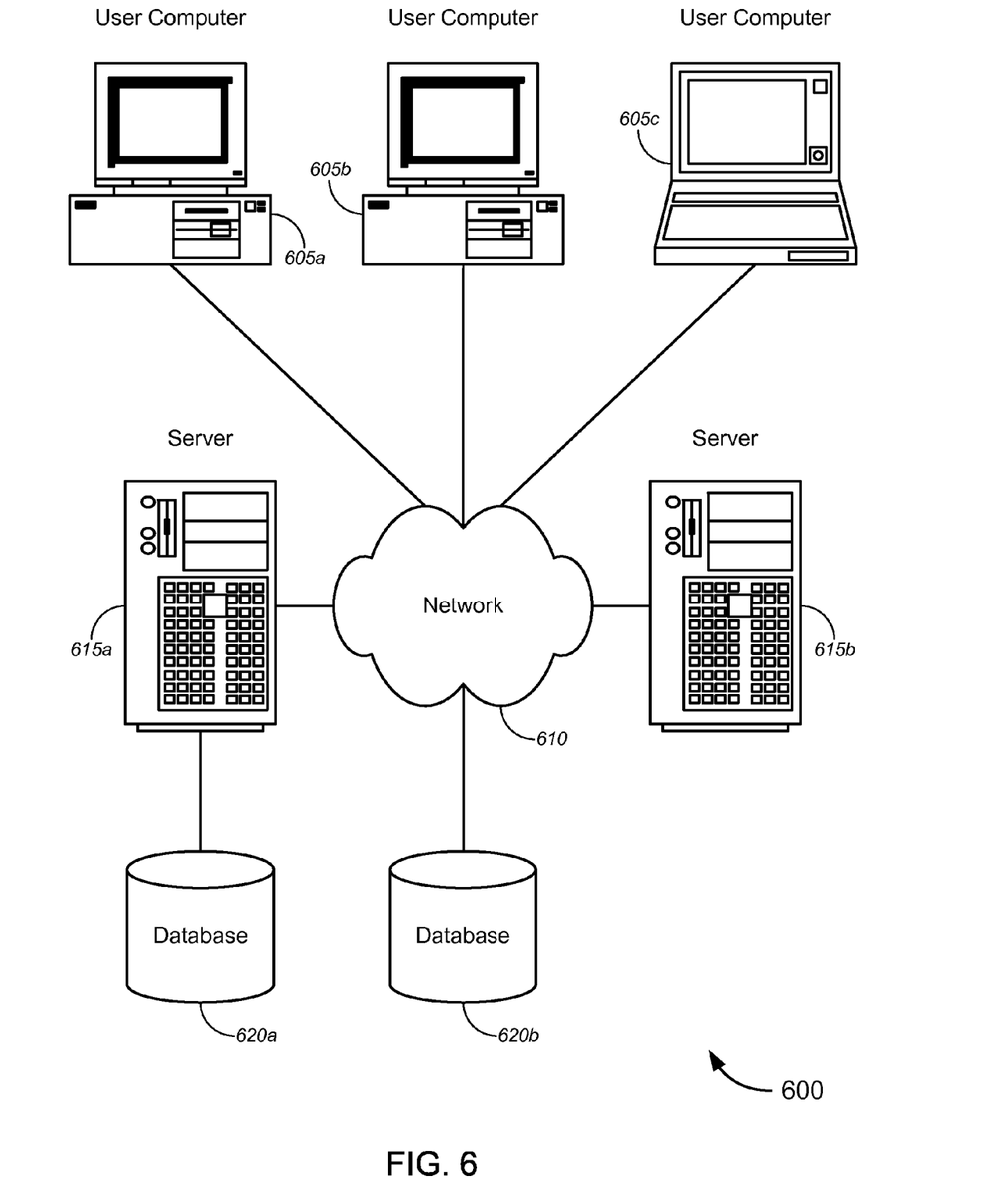
FIG. 6 is a block diagram illustrating a networked system of computers, which can be used in accordance with various embodiments.

A set of embodiments comprises systems for assisting a user in classifying products. Merely by way of example, FIG. 6 illustrates a schematic diagram of a system 600 that can be used in accordance with one set of embodiments. The system 600 can include one or more user computers 605. A user computer 605 can be a general purpose personal computers (including, merely by way of example, personal computers and/or laptop computers running any appropriate flavor of Microsoft Corp.'s Windows™ and/or Apple Corp.'s Macintosh™ operating systems) and/or a workstation computer running any of a variety of commercially-available UNIX™ or UNIX-like operating systems. A user computer 605 can also have any of a variety of applications, including one or more applications configured to perform methods provided by various embodiments (as described above, for example), as well as one or more office applications, database client and/or server applications, and/or web browser applications. Alternatively, a user computer 605 can be any other electronic device, such as a thin-client computer, Internet-enabled mobile telephone, and/or personal digital assistant, capable of communicating via a network (e.g., the network 610 described below) and/or displaying and navigating web pages or other types of electronic documents. Although the exemplary system 600 is shown with three user computers 605, any number of user computers can be supported.

Certain embodiments operate in a networked environment, which can include a network 610. The network 610 can be any type of network familiar to those skilled in the art that can support data communications using any of a variety of commercially-available (and/or free or proprietary) protocols, including without limitation TCP/IP, SNA, IPX, AppleTalk, and the like. Merely by way of example, the network 610 can include a local area network ("LAN"), including without limitation an Ethernet network, a Token-Ring network and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments can also include one or more server computers 615. Each of the server computers 615 may be configured with an operating system, including without limitation any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 may be a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle, Microsoft, Sybase™, IBM™ and the like, which can process requests from clients (including, depending on the configuration, dedicated database clients, API clients, web browsers, etc.) running on a user computer 605 and/or another server 615. In some embodiments, an application server can create web pages dynamically for displaying the information in accordance with various embodiments, such as for providing a user interface, as described above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620. The location of the database(s) 620 is discretionary: merely by way of example, a database 620*a* might reside on a storage medium local to (and/or resident in) a server 615*a* (and/or a user computer 605). Alternatively, a database 620*b* can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 635 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. Merely by way of example, the Appendix hereto, which is hereby incorporated by reference, describes several additional embodiments in further detail. As noted above, however, the details described with respect to any particular embodiment (including those mentioned in the Appendix) should not be considered essential to all embodiments or limiting in any way.

The methods and processes described herein may be implemented using hardware components, software components, and/or any combination thereof Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. In a procurement system executing a procurement enterprise application, a method of assisting a user in classifying a product, the method comprising:

providing, from the procurement system, a user interface for receiving input from the user during a procurement process executed by the procurement enterprise application;

obtaining product information at the procurement system about the product the user desires to procure as part of the procurement process;

generating, by the procurement system, one or more keywords based on the obtained product information, wherein
the one or more generated keywords relating to possible classifications for the product,
the possible classifications identifying one or more levels of a hierarchical classification taxonomy,
the hierarchical classification taxonomy comprising multiple levels and representing a plurality of products available for procurement through the procurement process;

clustering, by the procurement system based on a clustering model, similar keywords of the one or more generated keywords together to generate two or more sets of clustered keywords;

enriching, by the procurement system, the product information with the clustered keywords;

evaluating, by the procurement system, the enriched product information to determine a confidence level associated with each of the clustered keywords indicating a level of certainty that an inline-classification engine of the procurement system is able to correctly predict the product's categorization;

comparing, by the procurement system, the confidence level of each of the clustered keyword with a specified threshold;

sending, from the procurement system, at least one of the clustered keywords and the enriched product information to a classification engine, based on the comparison of the confidence level for each clustered keyword with a value meeting or exceeding the specified threshold;

generating, by the procurement system, one or more predicted classifications at the classification engine;

rating, by the procurement system, each of the one or more of the predicted classifications so that any of the predicted classifications with a largest rate value has a better predicted fit with the product and the product information;

ranking, by the procurement system, the one or more predicted classifications based on corresponding predicted fits;

presenting, by the procurement system, the one or more ranked predicted classifications to the user, with the user interface while the user is attempting to procure the product during the procurement process;

receiving, by the procurement system at the user interface, a selection of one of the presented, ranked predicted classifications during the procurement process; and classifying the product, by the procurement system, based at least in part on the selection and during the procurement process.

2. The method of claim 1, wherein the obtaining the product information comprises:
obtaining the product information from the user, via the user interface.

3. The method of claim 1, wherein the obtaining the product information comprises:
obtaining the product information from an online catalog.

4. The method of claim 1, wherein the obtaining the product information comprises:
obtaining the product information from a punchout to a website operated by a supplier of the product.

5. The method of claim 1, the obtaining the product information comprises:
obtaining data pertaining to the product information from a plurality of data sources.

6. The method of claim 5, further comprising:
normalizing the data pertaining to the product information from the plurality of data sources.

7. The method of claim 5, wherein the generating the one or more keywords comprise:
generating a result set from the data pertaining to the product information from the plurality of data sources, wherein the result set comprises the product information about the product the user desires to procure.

8. The method of claim 1, further comprising:
presenting the one or more generated keywords to the user, via the user interface; and
receiving, via the user interface, a selection of one or more keywords;
wherein the sending the at least one of the clustered keyword to the classification engine comprises sending the one or more selected keywords to the classification engine.

9. The method of claim 8, wherein the generating the one or more predicted classifications comprises generating the one or more predicted classifications based on an ontology, and wherein the method further comprises:
updating the ontology based on the one or more keywords selected by the user and the predicted classification selected by the user, to correlate the selected one or more keywords with the selected predicted classification.

10. The method of claim 1, wherein the sending the at least one of the one or more keywords to the classification engine comprises:
sending the at least one of the one or more keywords to the classification engine, based on a comparison of the confidence levels with the specified threshold.

11. The method of claim 1, wherein the one or more predicted classifications reside at a first level of the hierarchical classification taxonomy, the method further comprising:
generating one or more predicted classifications at a second level of the hierarchical classification taxonomy, based on the generated one or more keywords, wherein the second level of the hierarchical classification taxonomy is subordinate to the first level of the hierarchical classification taxonomy.

12. The method of claim 11, wherein the one or more predicted classifications at the second level of the hierarchical classification taxonomy are subclassifications of the predicted classification selected by the user.

13. The method of claim 11, further comprising:
receiving, at the user interface, a selection of one of the one or more predicted classifications at the second level of the classification taxonomy; and
classifying the product, based at least in part on the selection of the predicted classification at the second level of the classification taxonomy.

14. A computer system, comprising:
one or more processors; and
a memory coupled with the one or more processors, the memory having stored therein a set of instructions which, when executed by the processors, causes the processors to perform operations of assisting a user in classifying a product comprising:
providing a user interface for receiving input from the user during a procurement process executed by the procurement enterprise application;
obtaining product information at the procurement system about the product the user desires to procure as part of the procurement process;
generating one or more keywords based on the obtained product information, wherein
the one or more generated keywords relating to possible classifications for the product,
the possible classifications identifying one or more levels of a hierarchical classification taxonomy,
the hierarchical classification taxonomy comprising multiple levels and representing a plurality of products available for procurement through the procurement process;
clustering, based on a clustering model, similar keywords of the one or more generated keywords together to generate two or more sets of clustered keywords;
enriching the product information with the clustered keywords;
evaluating the enriched product information to determine a confidence level associated with each of the clustered keywords indicating a level of certainty that an inline-classification engine of the procurement system is able to correctly predict the product's categorization;
comparing the confidence level of each of the clustered keyword with a specified threshold;
sending at least one of the clustered keywords and the enriched product information to a classification engine, based on the comparison of the confidence level for each clustered keyword with a value meeting or exceeding the specified threshold;
generating one or more predicted classifications at the classification engine;
rating each of the one or more of the predicted classifications so that any of the predicted classifications with a largest rate value has a better predicted fit with the product and the product information;
ranking the one or more predicted classifications based on corresponding predicted fits;
presenting the one or more ranked predicted classifications to the user, with the user interface while the user is attempting to procure the product during the procurement process;
receiving, at the user interface, a selection of one of the presented, ranked predicted classifications during the procurement process; and
classifying the product based at least in part on the selection and during the procurement process.

15. A computer-readable storage memory comprising a set of instructions stored therein which, when executed by the processors, causes the processors to perform operations of assisting a user in classifying a product, comprising:
providing a user interface for receiving input from the user during a procurement process executed by the procurement enterprise application;
obtaining product information at the procurement system about the product the user desires to procure as part of the procurement process;
generating one or more keywords based on the obtained product information, wherein
the one or more generated keywords relating to possible classifications for the product,
the possible classifications identifying one or more levels of a hierarchical classification taxonomy,
the hierarchical classification taxonomy comprising multiple levels and representing a plurality of products available for procurement through the procurement process;
clustering, based on a clustering model, similar keywords of the one or more generated keywords together to generate two or more sets of clustered keywords;
enriching the product information with the clustered keywords;
evaluating the enriched product information to determine a confidence level associated with each of the clustered keywords indicating a level of certainty that an inline-classification engine of the procurement system is able to correctly predict the product's categorization;
comparing the confidence level of each of the clustered keyword with a specified threshold;
sending at least one of the clustered keywords and the enriched product information to a classification engine, based on the comparison of the confidence level for each clustered keyword with a value meeting or exceeding the specified threshold;
generating one or more predicted classifications at the classification engine;
rating each of the one or more of the predicted classifications so that any of the predicted classifications with a largest rate value has a better predicted fit with the product and the product information;
ranking the one or more predicted classifications based on corresponding predicted fits;
presenting the one or more ranked predicted classifications to the user, with the user interface while the user is attempting to procure the product during the procurement process;
receiving, at the user interface, a selection of one of the presented, ranked predicted classifications during the procurement process; and
classifying the product based at least in part on the selection and during the procurement process.

* * * * *

UNITED STATES PATENT AND TRADEMARK OFFICE
CERTIFICATE OF CORRECTION

| | | |
|---|---|---|
| PATENT NO. | : 8,768,930 B2 | Page 1 of 1 |
| APPLICATION NO. | : 12/767286 | |
| DATED | : July 1, 2014 | |
| INVENTOR(S) | : Yeleshwarapu et al. | |

It is certified that error appears in the above-identified patent and that said Letters Patent is hereby corrected as shown below:

In the Drawings

On sheet 3 of 6, in figure 6, under Reference Numeral 370, line 1, delete "CFR" and insert -- CRF --, therefor.

In the Specification

In column 2, line 35, delete "embodiments" and insert -- embodiments. --, therefor.

In column 2, line 38, delete "embodiments" and insert -- embodiments. --, therefor.

In column 12, line 45, delete "thereof" and insert -- thereof. --, therefor.

In the Claims

In column 14, line 19, in Claim 5, delete "the" and insert -- wherein the --, therefor.

In column 15, lines 17-18, in Claim 14, delete "process executed by the procurement enterprise application;" and insert -- process; --, therefor.

In column 15, lines 19-20, in Claim 14, delete "at the procurement system about" and insert -- about --, therefor.

In column 16, lines 11-12, in Claim 15, delete "process executed by the procurement enterprise application;" and insert -- process; --, therefor.

In column 16, lines 13-14, in Claim 15, delete "at the procurement system about" and insert -- about --, therefor.

Signed and Sealed this
Twenty-first Day of July, 2015

Michelle K. Lee
*Director of the United States Patent and Trademark Office*